Sept. 20, 1971  A. J. HASTINGS  3,605,365
PLASTIC FOAM BUILDING PANEL
Filed Sept. 8, 1969  6 Sheets-Sheet 1

INVENTOR.
ALLAN J. HASTINGS

BY  *Duane C. Bowen*

ATTORNEY

Sept. 20, 1971  A. J. HASTINGS  3,605,365
PLASTIC FOAM BUILDING PANEL
Filed Sept. 8, 1969  6 Sheets-Sheet 2
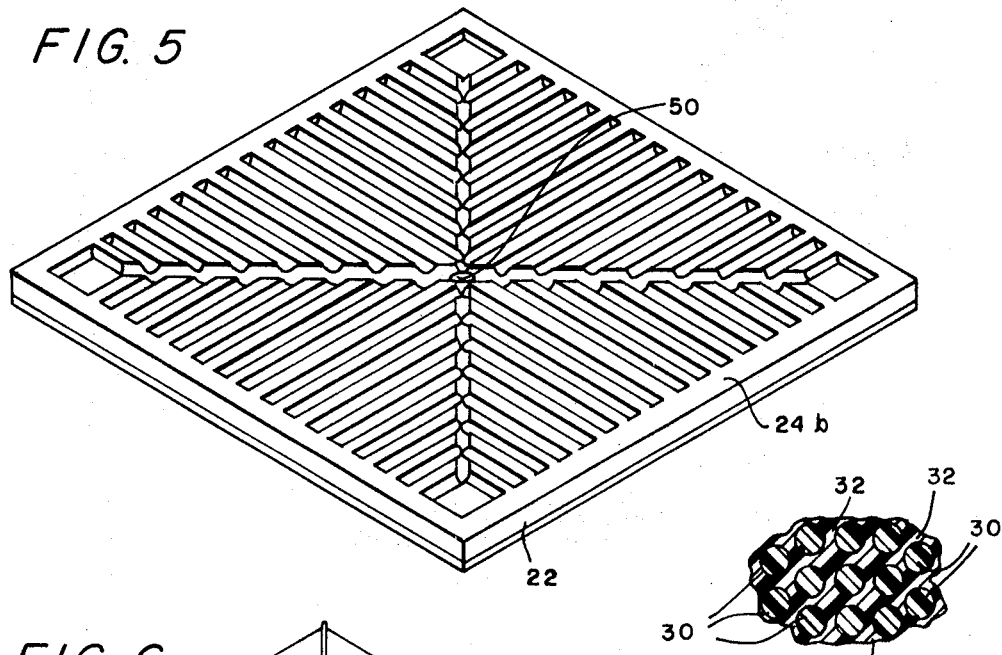
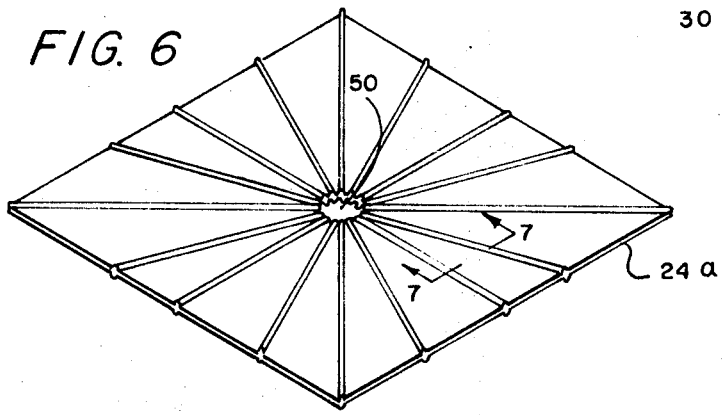
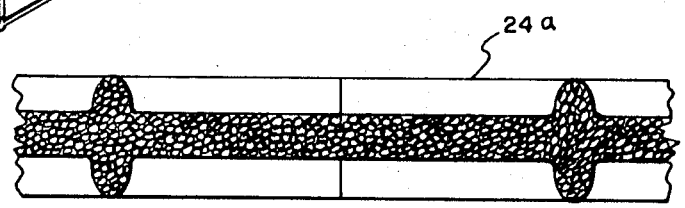
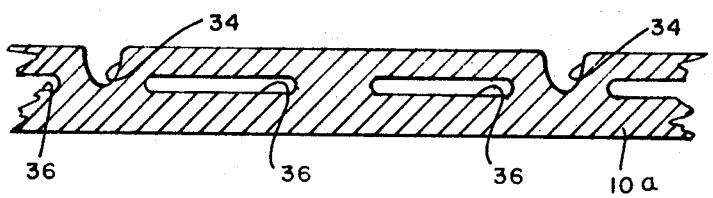
INVENTOR.
ALLAN J. HASTINGS
BY
ATTORNEY

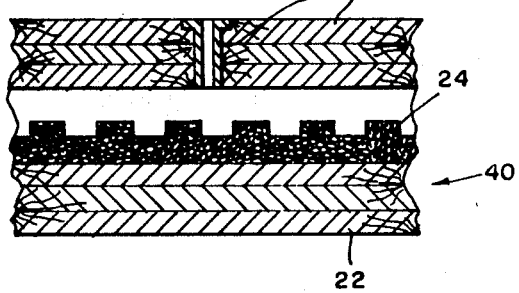
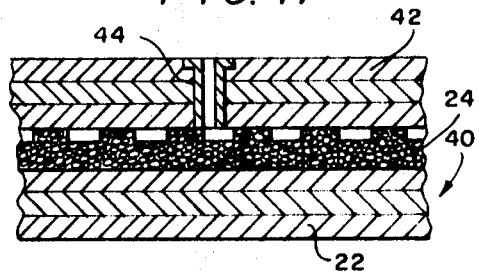
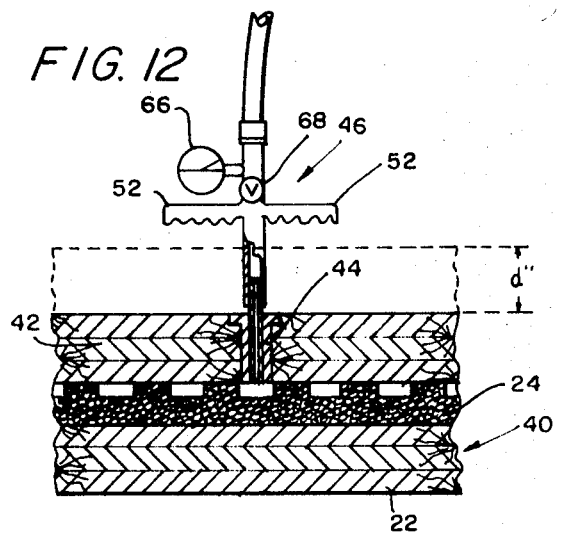
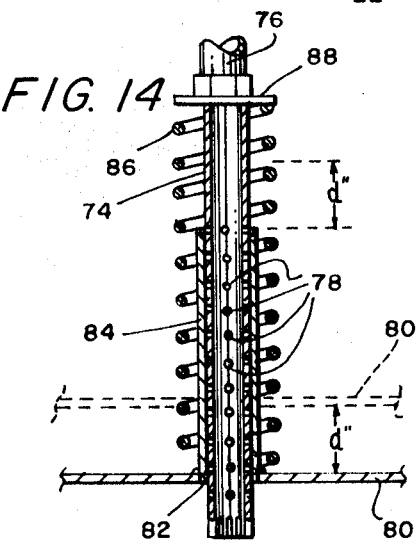
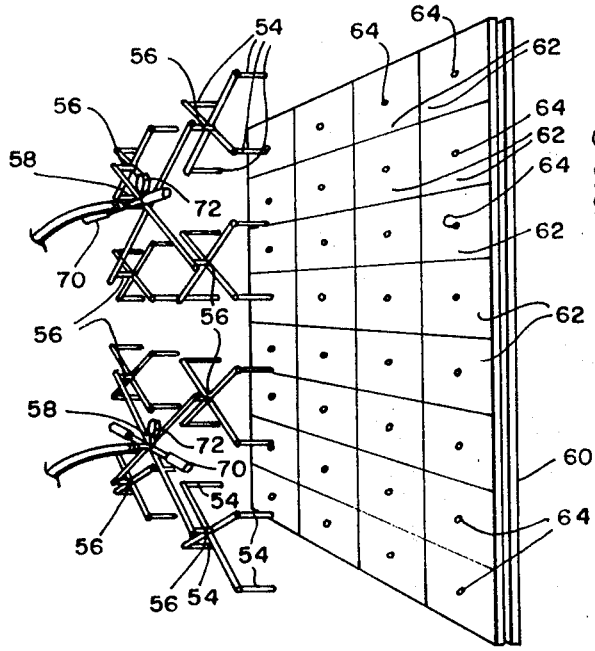
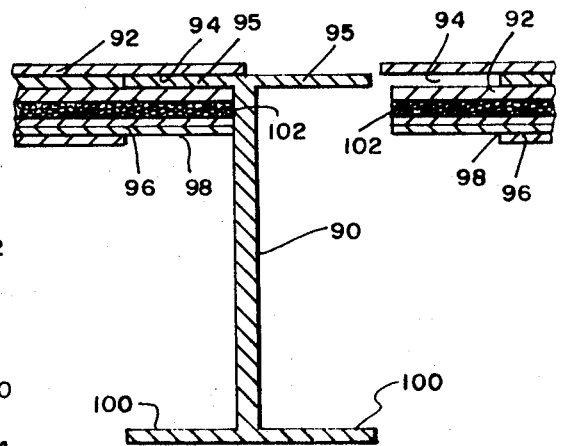

Sept. 20, 1971 A. J. HASTINGS 3,605,365
PLASTIC FOAM BUILDING PANEL
Filed Sept. 8, 1969 6 Sheets-Sheet 4
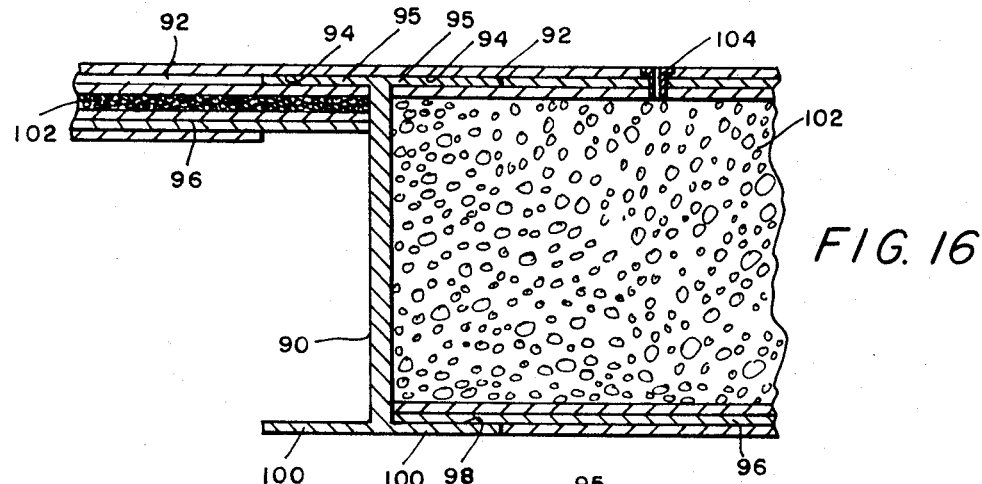
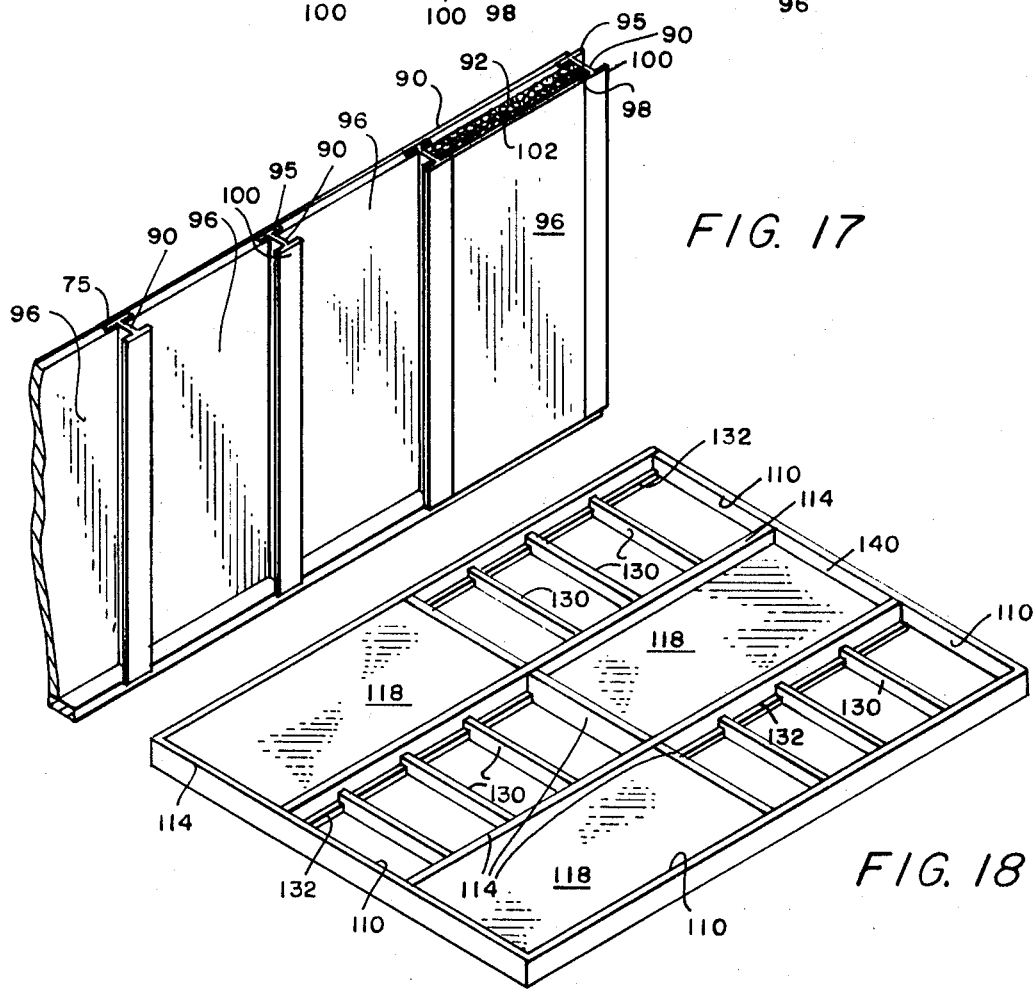
INVENTOR.
ALLAN J. HASTINGS
BY
ATTORNEY Sept. 20, 1971   A. J. HASTINGS   3,605,365
PLASTIC FOAM BUILDING PANEL
Filed Sept. 8, 1969   6 Sheets-Sheet 5

INVENTOR.
ALLAN J. HASTINGS
BY
ATTORNEY

Sept. 20, 1971   A. J. HASTINGS   3,605,365
PLASTIC FOAM BUILDING PANEL
Filed Sept. 8, 1969   6 Sheets-Sheet 6

INVENTOR.
ALLAN J. HASTINGS
BY
ATTORNEY

United States Patent Office 3,605,365
Patented Sept. 20, 1971

3,605,365
PLASTIC FOAM BUILDING PANEL
Allan J. Hastings, 2201 Dallas St.,
Royal Oaks, Mich. 48067
Filed Sept. 8, 1969, Ser. No. 855,808
Int. Cl. E04c 2/10; E04b 2/56; B29d 27/00
U.S. Cl. 52—309                           15 Claims

ABSTRACT OF THE DISCLOSURE

In a manufacturing plant a preformed or prefoamed sheet is formed of heat expandable plastic foam material with at least one face having a pattern of relatively raised and depressed portions forming steam channel and distribution means and with or without a face ply bonded to one face of the sheets; and at a building site the sheet is juxtaposed to planar building forms, or to planar face plies, depending on whether or not the wall is to be laminated, and steam is applied through the channel and distribution means to expand the plastic foam material to fabricate a building wall.

BRIEF SUMMARY OF THE INVENTION

My invention relates to building modular fabrication techniques, including forming foam plastic walls, comprising making a preformed or prefoamed plastic sheet in a plant and expanding the sheet (between building forms or face plies) at a building site by steam conducted across the face of the plastic sheet by channels formed therein at the plant.

BACKGROUND OF INVENTION AND OBJECTIVES

Plastic foam has been exercised as building wall material in a form completely expanded in a plant and, hence, transported to the building site in fully expanded form. The disadvantage in terms of transportation cost, etc., to shipping expanded foam is obvious, i.e., the plastic may expand in volume as much as 30 to 40 times during complete expansion. Note that shipment in even prefoamed condition, even as much as 60–70% expanded, would still be a great saving in volume shipped. Within certain limits, some transportation costs are directly responsive to volume of the article to be shipped. Transportation, of course, is a large factor in article cost. It is an objective of my invention to avoid cost of shipment from plant to building site of plastic foam building wall material in at least completely expanded form.

Note that a completely expanded plastic foam can be a fragile item during shipment. It is another objective of my invention to avoid crushing of expanded form during shipment. Crushing during warehousing, shipment, etc., could be of corner, edge or puncture type, but another type is merely general face compression, as, for example, from ovrloading due to stacking panels too high. This means that a normal 6″ wall can become 5¾″, etc., which leads to wall irregularity if used and waste if not used.

A panel expanded at a building site can adapt to use, such as by expansion "in situ" integrating wall structural members, etc. It is an objective of my invention to take advantage of integration and other advantages and capabilities of on-the-site expansion while avoiding some of the hazards of other foam techniques. One foam technique now used in the building industry for in situ fabrication is spray usage of particularly urethane foam. While such spray method has advantages and applications, it also has disadvantages and limitations. Such prior spray methods can involve pre-mixing as many as eight chemicals, pre-heating chemically to activate blowing agents, and other process details difficult enough to control under factory conditions and leading to many difficulties on the building site including greater variations in temperature and humidity, so that the full potential of the foam is not achieved, standardization of the product is difficult, etc. It will be understood, further, that it is difficult to adapt a spray technique to a laminated construction. Another variation of on-the-site foaming that has been exercised involves the use of raw chemicals, mixing on the site, deposit in a forming cavity, etc. The foaming process, starting with raw chemicals, is a difficult process (due partly to the many variables) even under factory conditions, and the variables are increased on-the-site or in situ, so that this has proven to be a building method of limited success and application. An improved process usable on the building site would be desirable.

Additional objectives of my invention include (a) to make an improved plastic foam wall member, particularly a sandwich core, in which at least part of the processing is accomplished on the building site, but in which, as an option, a prefoaming operation can be accomplished at the plant, under factory conditions; (b) to make a new standardized building module; (c) to provide in such module all of the advantages now found in foam or foam-core panels, such as low thermal conductivity, light weight, variable shear, bending and compression stress values depending on foam formulation, durability, resistance to decay, resistance (with additives) to fire, etc.; (d) to provide a wall system capable of being manufactured on a high production basis and otherwise to be economical, as a substitute for previous materials and to take advantage of more of the potentials of foams in building application; and (e) to improve on ancillary matters such as steam probe equipment, integration of plastic foam module and other building structure, etc.

Further advantages and objectives of my invention will be understood from the following description, read with reference to the drawings, in which:

FIGS. 1, 2, and 3 are sequential perspective views of processing equipment and steps forming part of a specific embodiment of my invention. The bottom die is sectioned by having a sidewall removed in these views to better reveal the operations which are in-plant processing producing a partly formed building "wall" module.

FIGS. 4–8 relate to surface treatments of such partly formed building modules. The purpose of the surface treatments is to distribute steam across a face or faces of the partly formed (preformed or prefoamed) building module in later building-site processing to fully expanded condition. The FIGS. 4 and 5 form (shown in progressively enlarged perspectives) can be described as being grooved, whereas the FIGS. 6 and 7 form (shown in FIG. 6 in perspective and shown in FIG. 7 in fragmentary cross-section taken on line 7—7 of FIG. 6) can be described as having spaced ribs upstanding from an otherwise planar surface. FIGS. 4 and 5 can be taken as showing configuring (with grooves) only one face of a partly formed building module (as in the process of FIGS. 1–3 in which only an upper face is configured by an upper die), whereas FIGS. 6 and 7 can be taken as showing configuring (with ribs) both upper and lower faces of a partly formed foam plastic building module. FIG. 8 is a partial, enlarged cross-sectional view of a lower die for forming the lower face of the ribbed configuration shown in FIGS. 6 and 7.

FIG. 9 is an enlarged, fragmentary sectional view showing particles of plastic foam and a binder therefor.

FIGS. 10, 11, and 12 are views partly in section showing sequential operations in processing on a building-site a building module from preformed or prefoamed state to a fully expanded state. FIG. 12 also shows a steam probe providing steam in the process of fully expanding the plastic foam.

FIG. 13 is a perspective view of steam probe assemblies and a building module in which the probes are used.

FIG. 14 is a view, partly in section, of a form of steam probe.

FIGS. 15 and 16 are sequential sectional views showing in place processing in a building structure of a building module from preformed or prefoamed condition to fully expanded condition.

FIGS. 17 is a fragmentary perspective view, partly in section, of a wall in which building modules are being expanded in place, FIG. 18 is a view of similar nature only of a floor, FIG. 17 follows the FIG. 15–16 building system whereas FIGS. 18 and 19 are somewhat modified systems.

FIG. 22 also showing fasteners therefor.

Figure 1:
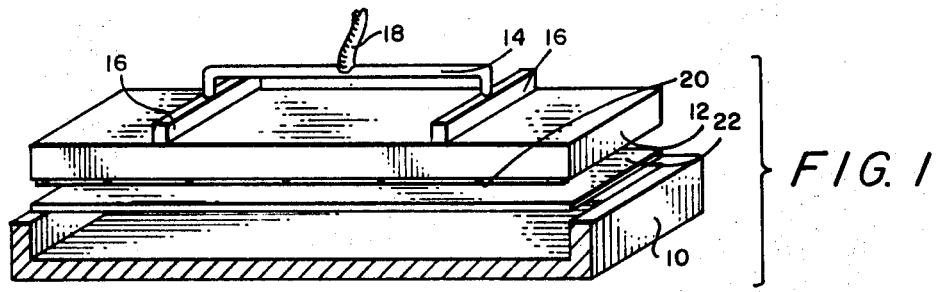

The basic material concerned in my building modular fabrication techniques is expandable foam plastic. Heat energy to soften such plastic material and to expand its blowing agent include hot air, heated baths, radiant energy, etc., but I am primarily concerned with steam as the energy source. I will first indicate the pertinent state of the art in expandable foam plastics. I want to establish that expandable foam plastic processing and the terminology of that art I use are well known by those skilled in the art, so that I will not need to elaborate herein on processes which are within the everyday expected skill of those working in expanding foam plastics. My invention is not in the chemistry of foam plastics but instead is in mechanical means and construction trade techniques involved in building modular fabrication.

In the known art, a variety of thermoplastic polymeric and resinous materials may be expanded from a granular, bead or pellet form to assume a porous, multicellular, solidified foam-like structure by the action of various propellants or agents for expanding or blowing the material to a foam. An example is Dow Chemical's expandable polystyrene beads having the trademark "Pelaspan." A general 32 page description of "Pelaspan Expandable Polystyrene" is found in the Dow Chemical publication of that name, copyright 1966. Among other pertinent descriptions included therein are: (a) flame retardant formulations (variously pertinent to my building materials when "fire proofing" is an objective); (b) colored formulations (which can give wall surfaces which do not require painting for decorative effect); (c) desirable general properties for my building construction purposes such as lightness of weight, good dielectric properties, chemical resistance, low thermal conductivity, high strength to weight ratio, low moisture absorption and water vapor transmission, etc.; (d) foam expansion of beads including first prefoaming or expanding to as much as 10–40 times original volume and later (after aging) molding by steam for further expansion and shaping; (e) steam chest molding (which my "in place" molding simulates) or, even more pertinent, steam probe molding:

"Another method of introducing steam into a mold cavity is by a probe which is inserted through a hole in the mold wall. When expansion is nearly complete, the probe is withdrawn. When the probe is withdrawn quickly after steaming the hot foam continues to expand, closing off the probe hole. Multiple probes are used for large cross sections. It is the only practical method available for molding between structural facings."

(e) adhesives for expanded polystyrene; (f) facings for foam cores:

"Hard surface facings may be applied during or after molding. These facings may be made from such materials as high impact polystyrene, metal, plywood, and cured reinforced polyester. These may be directly laminated with suitable adhesives to foams of expanded Pelaspan.

"Panels of sandwich type construction are presently being manufactured by expanding Pelaspan beads between two preshaped facings. The facings are precoated with a rubber or resin solvent-based adhesive prior to foaming with steam probes. Sandwich panels and refrigerator doors are manufactured by this technique."

and (g) blowing agents, times, temperatures, pressures and other chemical process details.

The Dow Chemical materials and processes are further explained in Patent 3,154,604 (several plastic materials of Dow which are preformed or prefoamed, etc., including use of a bonding agent). A general review, entitled "Foamed Plastics," appears in the 1968 Modern Plastics Encyclopedia and includes articles on "Molded Structural Foams" and on "Polystyrene Foams," the latter being contributed by the Dow Chemical Company.

The above references identify the base material, expandable plastic foam, an expression known and understood in the chemical industry. My modular fabrication techniques use prefoaming and preforming. "Prefoaming" is defined by those working in the art as the controlled partial expansion of the plastic foam materials before a later step (separated by time) of completing expansion of the plastic foam material. The method used is like the general art of batch prefoaming. Note, as I want a panel like body, bead fusion is desirable (although a bonding agent can also be used as described in Patent 3,154,604), whereas commonly in prefoaming (batch and other types) avoidance of fusion is an objective and in both steam and hot air types of batch prefoaming the beads may be first coated with a liquid detergent in water to inhibit fusion. Patent 3,154,604 gives example of prefoaming and later completion of expansion. "Preforming" is defined by those working in the art as cohesive and/or adhesive processes forming plastic beads, granules, or pellets into sheet like form, whether or not any prefoaming has taken place. Patent 3,154,604 gives example of preforming.

Figure 2:
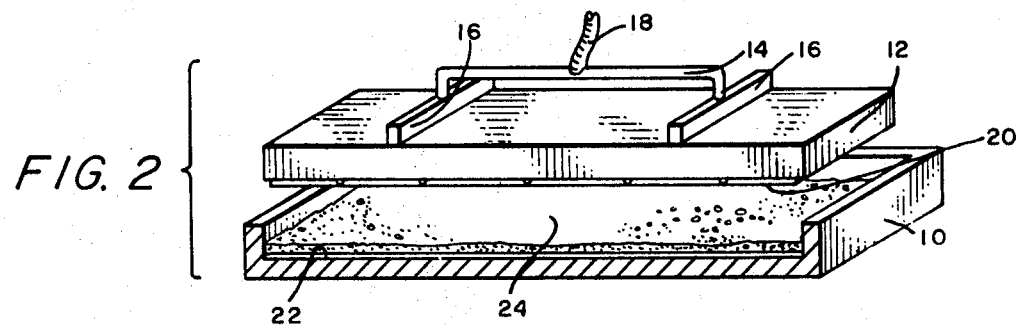
Figure 3:
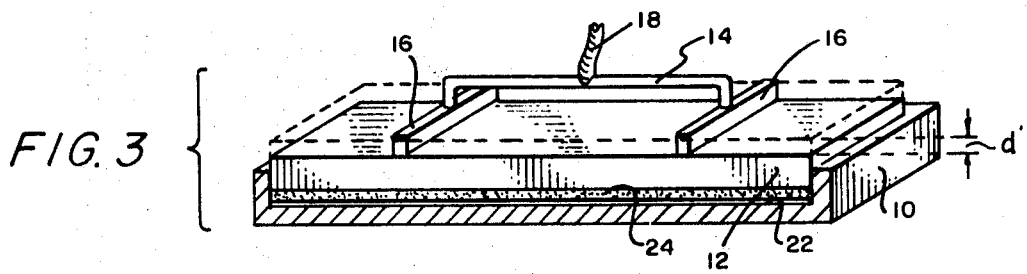

I will now proceed to describe my moduler fabrication techniques. FIGS. 1–3 show a lower die 10, an upper die 12, steam distribution means 14, 16 to upper die 12, a steam line 18 to steam distribution means 14, and a raised embossing 20 on the lower face of upper die 12 (forming patterns on a preform or prefoam of the types of FIGS. 4–5 or FIGS. 6–7).

The sequence of FIGS. 1–3 is as follows:

(1) The introduction of a sheet of plywood 22 to the steam chest in FIG. 1. The plywood normally could be ¼", ⁵⁄₁₆", ⅜" or ¾", three to five ply. Other sheet materials could be substituted such as hardboard, or even plastic (i.e., high impact polystyrene or cured reinforced polyester), glass, metal, etc., sheets, although usually a wood product will be most applicable particularly in a wood framed structure as particularly plywood is a good laminating structure when, as here, the strength of the laminant will primarily depend on the plywood until it is processed in place on the building site.

(2) Deposit of plastic foam beads or the like 24 on the upper surface of plywood 22. In most cases prefoaming is to be conducted in the FIG. 1–3 process in which case the plastic foam should be an expandable plastic foam should be an expandable plastic foam having a prefoaming capability. If only preforming is accomplished, then prefoaming capability is not needed. A specific example of of a foam which can be prefoamed is the Dow Pelaspan Expandable Polystyrene 222 GP.

(3) FIG. 3 shows the application of steam to beads or pellets 24 and a prefoaming expansion $d'$. It will be understood that the thickness of the layer of foam materials 24 deposited in FIG. 2 is sufficient to be finally expandable to the selected wall thickness in the building together with any face laminants, i.e., six inches. The expansion $d'$ is selected as being an expansion less than the final expansion and, to minimize storage and shipment space, an expansion of the least thickness that will achieve some sheet cohesiveness or rigidity in the process and will be a satisfactory prefoam. The final thickness of the prefoam 24 may be as small as ¼" to 1".

Continuing the example with Pelaspan 222 GP: Prefoaming with steam should be at 212° F. The cavity between dies 10 and 12 is preheated with steam. A density of about 1.0 lb./cu. ft. is achieved. If it is desirable to laminate plywood 22 to the foam layer 24, plywood 22 can be given a pre-coating (upper face) with a rubber or resin solvent-based adhesive (this provision can be eliminated if the foam material used, or a binder therefor, becomes adhesive to the face ply, or vice versa, at prefoam temperature and time). If preforming instead is to be conducted typical process specifications are given in Pat. 3,154,604. It is to be understood the bonding (cohesive and/or adhesive) processes are to be conducted in the same equipment and steps shown in FIGS. 1–3 except there is no expansion $d'$ when steam is applied in FIG. 3.

The standard module size is 4' x 8' which is to be taken as the dimensions of the die cavity in FIGS. 1–3. Although most mass production is designed with the standard 4' x 8' module, a half size (4' x 4') or other sub-standard size can be mass produced (rather than sawed) when that size recurs frequently enough in design, or special door, window, etc, panels can be mass produced, but my design system is primarily to produce 4' x 8' modules and to cut, etc., all other sizes and shapes before or after final expansion. This system presumes primarily housing with substantially 8' ceilings, whereas in some other types of structures, i.e., trailer manufacture, a different height or even width may make a better standard module. For convenience in claims or specification, if I will use the expression "wall" to describe the enclosing function of the standard building module, this is to be interpreted, when needed, to include floor or ceiling panels, as well as side wall panels.

Aging after prefoaming and before further expansion in the above example is preferably a minimum of 48 hours and a recommended maximum of 21 days, with Pelaspan 222 GP. Although a similar foam pellet can be provided with fire resistance, I do not need to detail that option. Of course for a fully laminated structure, color is not a consideration but when at least one face is to be exposed in use, bright colors can be obtained by using a colored pellet (i.e., Pelaspan 101) or if pastel colors are suitable then surfaces can be treated after expansion is completed by surface coloring with dyes or dry blend colors. As this is within the skill of the art, I will not detail coloring, although coloring can be a real consideration in some building applications. Various coatings can be applied to wall surfaces or a paper, plastic or other layer can be bonded to the wall surfaces for decorative or other purposes, in the final finish of a wall.

Heating time in the prefoamer depends on the formulation and the amount of expansion desired. Avoidance of heating to the point of bead collapse should be avoided. In my applications expansion will not be nearly maximized. Usually the time will be about a minute with Pelaspan formulations, whereas several minutes would be required to bring the beads near to collapse. However, it will be understood that exact times depend on the construction of the dies, the manner of steam distribution, the size and thickness of outer ply and foam laminant, etc., and the chemical engineer will need to specify limits for each installation according to the specifications of the particular expandable plastic foam material.

A "prefoam" should be clearly distinguished from a "preform." These two operations are well identified in the referenced Dow Chemical Pat. No. 3,154,604. It is my intention, to use either prefoaming or preforming, or both, to manufacture in-plant a sheet-like structure, with enough sheet-like quality, with or without a face ply as the case may be, to be shipped to the building site while usually maintaining sheet integrity. Pat. 3,154,604 describes preforming with or without previous, simultaneous, or later prefoaming, and this is also my intention. Rather than repeat more material on prefoaming and preforming, Pat. 3,154,604 is referenced herein and patent terminology on preforming and prefoaming is followed. The ⅝" pre-expanded preform set forth in Example VI of Pat. 3,154,604 is specifically usable in my processes.

It will be understood that dies 10, 12 can be used (a) to provide minimum restraint during preforming and/or prefoaming, (b) to accept pressure due to prefoaming expansion pressures, or (c) to provide positive compressive pressures during or after preforming and/or prefoaming. Of course, by definition some expansion space (i.e., $d'$) has to be provided by dies 10, 12 to achieve prefoaming, as this is an expansion process.

FIG. 9 illustrates particles (granules, beads, pellets) 30 of expandable plastic foam material coated with a bonding agent 32. As defined in Pat. 3,154,604, bonding agent 32 is preferable a low molecular weight, nonvolatile, thermoplastic polymeric bonding agent that is adapted to flow below prefoaming temperatures if prefoaming is to be avoided or that is adapted to flow no higher than at prefoaming temperatures if prefoaming is to be utilized. The bonding agent, of course, has an adhesive effect upon the expandable plastic foam material, and, as above recited, may be also or instead used for bonding to a suitable face ply 22.

It should be noted at this point that prefoaming in my processes can have (in addition to the function of helping to form in the factory a sheet like building module) the normal function of achieving a better article with certain plastics in final expansion than if the processor directly brings to final expansion completely unexpanded granules of these expandable thermoplastic materials.

FIG. 8 shows a form of lower die 10a in which grooves 34 are provided (in the same manner as the lower surface of upper die 12 in FIGS. 1–3 is configured at 22 with ribs or grooves). A configured lower die would be used (two configured dies would be used) when a double faced, non-laminated sheet such as is shown in FIGS. 6 and 7 is to be produced. FIG. 8 also shows passageways 36 through which coolant can be run to cool the die. Both upper and lower dies can have cooling passageways. It will be understood by those working in the art that the steps involved in FIGS. 1–8 are: (a) preheating, (b) loading, (c) heating, (d) dwell, (e) cooling (via, for example, cooling water circulated in passageways 36), and (f) mold unloading. More specifically in an example installation and process, with Pelaspan 222 GP beads (note, however, as before related, that the chemical engineer will need to specify limits for each installation and material) (a) die cavity preheated to near temperature of steam, (b) heating after loading by steam at 212° F., and about 17 p.s.i.g. until (about 1 second) prefoaming occurs during heating and dwell in an expansion of about ten times original volume but only about 15% of fully expanded volume. Fusion is permitted in order to obtain sheet characteristics. Cooling then occurs and finally die unloading.

As a modification the Pelaspan 222 GP beads are prefoamed to a like extent but in any manner outside of dies 10, 12, the beads are mixed with a hot melt wax (paraffin) and then placed in the cavity between dies 10 and 12 at a temperature of 150–200° F. with moderate die pressure, thereby, upon cooling and mold release, providing a sheet-like preformed and prefoamed building module. Patent 3,154,604 gives more or less similar examples with other bonding agents.

Figure 4:
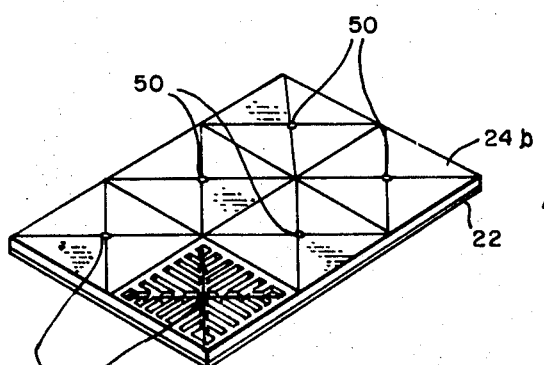

The ribbed preform or prefoam 24a of FIGS. 6 and 7 is the preferred embodiment as to ribbing and grooving, as it provides more steam distribution area than the grooved preform or prefoam 26b of FIGS. 4 and 5. FIGS. 4 and 5 show lamination to sheet 22, which may occur during preforming or prefoaming in dies 10–12, whereas FIGS. 6 and 7 show a self-supporting sheet 24a which is not laminated at least at the preform or prefoam stage. Of course, either surface pattern could apply to the laminant and vice versa. Applicable designs are not restricted to ribs and grooves, i.e., another version would have raised detents. The essential matter is to have a surface with relatively raised and lowered portions and adapted to pass steam across the face of the plastic sheet 24 through the lowered portions to insure easy contact of steam to all parts of the face initially when final expansion is initiated.

The fabrication steps of the building module system at the building site is shown in FIGS. 10–12. It is in these steps that final foam expansion occurs. The product from the FIG. 1–3 factory fabrication can be a sheet structure 40 which is formed by a laminant of a plywood face sheet 22 and a plastic foam preform or prefoam 24 bonded to sheet 22. The process of FIGS. 10–12 could be conducted at the building site between dies (such as 10, 12 in FIGS. 1–3), in another type of steam chest, etc. However, the preferred embodiment is with the side and end edges closed by building structure (as shown in FIGS. 15–19) and with the second face ply (plywood or other sheet material) 42 having fittings 44 accepting steam probes, such as steam probe assembly 46, so that, in effect, a steam chest for final foam expansion is formed by two face laminants 22, 42 and by framing or the like at the edges, in "in situ" or "in place" fabrication. Fittings 44 or other steam probe access could take various forms but is shown as a flanged sleeve pressed in place in a counterbored passage. The passage will tend to be filled with foam material after foam expansion, but if concealment of fittings 44 is desired in final use, this can be provided by removal and patching, covering, etc. Depending on the use of the building module (i.e., the finish required), the type of steam probe equipment used, the type of foam, etc., a simple bore through sheet 42 will sometimes suffice for steam access. Steam inlet openings can be associated with vent openings, vent means can otherwise be provided, "cracking" of steam enclosures can be used for venting, or the tolerances of "in situ" processing may provide natural venting.

It will be understood that each steam probe fitting 44 is aligned with a center 50 of an embossed pattern such as 24a or 24b of FIGS. 4–7. Probes 46 could be individual and separate, i.e., see probe 46 in FIG. 12 having insulated cross-arm 52 to be grasped manually to position the probe in fitting 44. However, the more common situation is with probes 54 banked as shown in FIG. 13. Probes 54 are disposed in fours in groups 56 and the groups 56 are disposed in fours in banks 58, both connected in X dispositions. The module 60 in FIG. 13 illustrates patterns 62, each having a center 64 aligned with a probe 54, each pattern 62 being 12" by 12" whereby the module 60 is 4' x 8' and steam is supplied to expand the same by two banks 58 of probes (thirty-two probes in all). The X groupings of probes and banks of probe groups results in equal steam delivery to each probe 54, which is important in quality of the expanded form. In the basic form of individual probe 46 in FIG. 12, a gauge 66 is shown registering pressure and/or temperature, and unless a distribution system is used of the X configuration of FIG. 13, or the equivalent which assures equal steam pressure and temperature, each probe will be valved (see valve 68 in FIG. 12) so that the valves (usually solenoid operated centrally) are not opened until each probe 46 registers the same pressure and/or temperature on gauge 66. Bank of probes 58 also have handles 70 and gauges 72 and may even have individual probe valves for the same purpose as related above. The probe banks may be suitably, releasably latched in place by means associated with at least some of the individual probes or with the banks in general.

Concealing probe inlets such as openings 64 during wall finish operations occasionally can be a problem. One solution is to locate the probe openings at the base of face grooves which may be considered as decorative or later may be filled with suitable strips or other material.

Completing the discussion of probes, FIG. 14 shows a stationary probe 74, supplied with steam through line 76, and having a series of spaced side steam egress openings 78. Probe 74 concerns the problem of providing in such stationary probe an accommodation continuing to feed steam to the plane of expansion as the foam expands a distance such as $d''$. Sheet 80 represents either a face laminant (like sheet 42 in FIGS. 10–12) or a building form wall shaping the foam into wall thickness. Sheet 80 has about probe access openings 82 a sleeve 84. A light compression spring 86 between a flange 88 and sheet 80 gives during expansion whereby sleeve 84 progressively uncovers steam egress openings 78 to the plane of the face of the expanding foam. At the end of expansion, removal of probe 74 will result in the foam flowing into and filling the removal area.

FIGS. 10–12 shows the final expansion of the preform or prefoam 24, FIG. 10 showing the assembly of the laminants, FIG. 11 showing the members ready for the steam probe, and FIG. 12, showing the application of steam probe 46 expanding sheet 24 in amount $d''$. The amount of expansion $d''$ depends on whether sheet 24 is a preform or a prefoam, the amount of previous expansion of the plastic foam material, what the desired density is, and how far the expansion process is carried out. It will be understood that the final expansion is variable and the chemical or plastic engineer will specify conditions for each material, etc. However, the expanded module usually will be typically about 6" in thickness and it will be a general objective to keep foam sheet 24 an inch or less in thickness to minimize shipment and storage space. The expansion $d''$ is accommodated by relative movement between face sheets 40 and 24. Usually it will only be sheet 42 that is moved. Movement of sheet 42 can be caused by steam pressure and/or the pressure of expanding gases in foam material 24, or sheet 42 can be moved manually or mechanically during the expansion process the distance $d''$ preferably according to a set program.

Sheets 22, 42 are shown in FIGS. 10–12 to be plywood, i.e., 1/4", 3/8", 1/2", or 3/4", 3 or 5 ply, and sheet 22 can be taken to have been bonded to preform or prefoam 24 during the factory processing of FIGS. 1–3 and sheet 42 can be taken as being added as a face laminant during this building site final foam expansion. However, I want to point out a different condition in which sheet 24 is separate from sheet 22, and sheets 42 and 22 are building form walls at the building site which will be removed after foam 24 is fully expanded and after the foam has cooled at least to the point of structural stability Of course, there are structural and/or other advantages to laminated structures and the foam sheet 24 will be much easier handled, shipped, etc., if laminated to sheet 22 and/or sheet 42 in the factory.

FIGS. 15, 16 and 17 illustrate an integration of the modular foam system into the structural forms of the building system. As illustrated, I-beam forms 90 are vertical members of a wall. One plywood face ply 92 has saw kerfs 94 receiving flanges 95 of I-beams 90 and the other plywood face ply 96 has sawn or otherwise formed recesses 98 receiving other flanges 100 of I-beams 90. Steam is injected to foam interlayer 102 through steam probe fittings 104 (like fitting 44 in FIGS. 10–12). In the process of assembly on the building site, the wall modules (in which plies 92, 96, 102 are partly or wholly processed and assembled in the factory) are positioned or assembled with the saw kerfs (or recesses) 94 of face piles 92 engaged with flanges 95 of I-beams 90, as illustrated in FIG. 15. Then steam is applied to interplies 102 via fittings 104 in plies 92 thereby expanding the laminant as shown at the right in FIGS. 16 and 17 until recess 98 in face ply 96 is engaged with flange 100 of I-beam 90.

Figure 19:
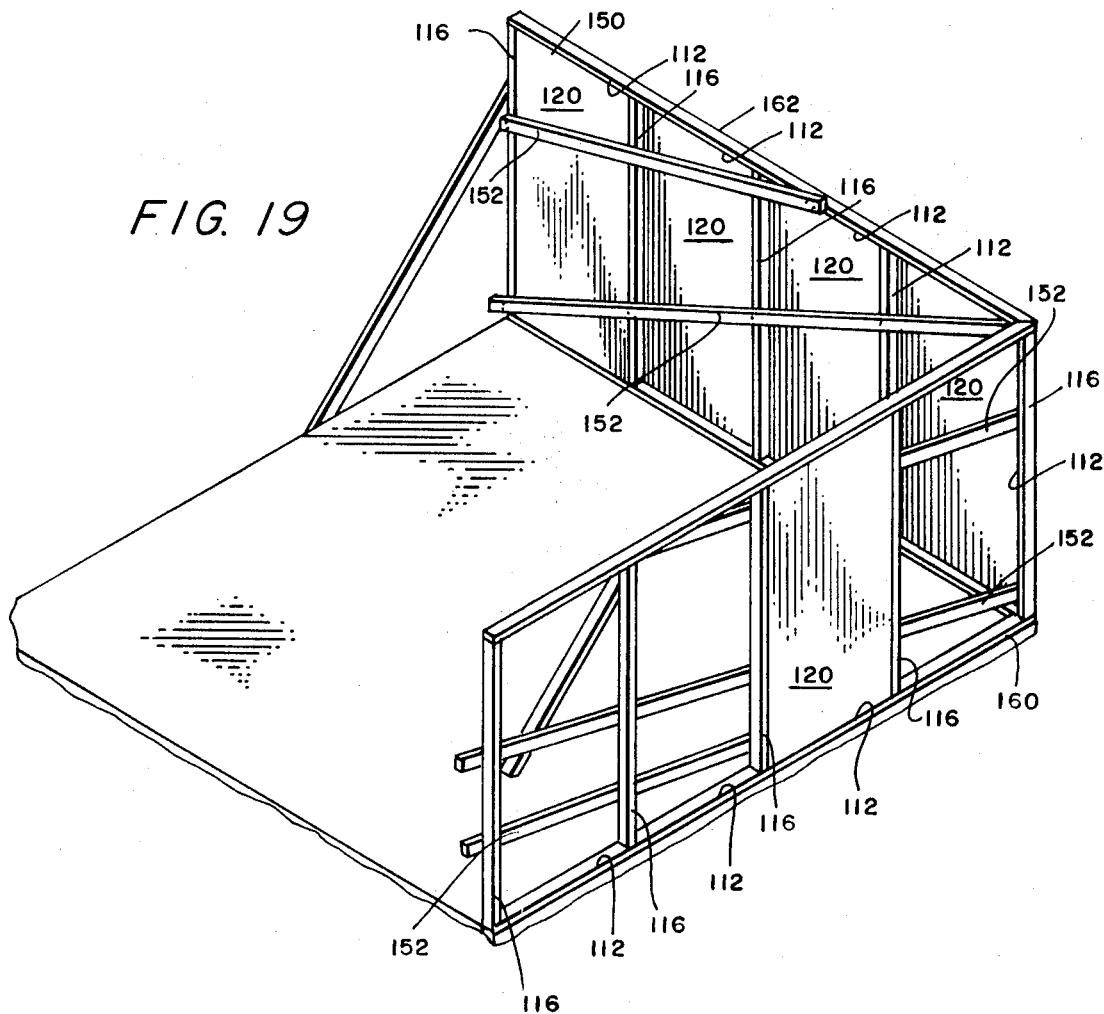
FIG. 19 is a view of similar nature of a pair of walls.

FIGS. 18 and 19 illustrate the general modular floor and wall system in which floor recesses 110 and wall recesses 112 are standard modular sizes, illustrated as 4' x 8' as this is presently the most common panel modular size. The floor and wall designs differ from conventional building practices in having joists 114 and studs 116 on 4' and 8' and on 4' intervals, respectively, as compared to the conventional spacing of joists 12", 16", 18" or 24" on centers and as compared to the conventional spacing of studs 16" or 24" on center. I have found, in fact, that it is better to use full 4' x 8' panels which results laterally in 4'1½" spacing on centers of structural members, rather than to use 4' on center construction which requires trimming of standard panels (i.e., plywood face plies) 1½". This is a choice between alternatives, and some construction industry people may prefer to preserve the conventional "on center" standards in the form of 4' on center spacing (which matches three 16" on center spacings) and trim any panels that can't be formed originally in 3'10½" sizes.

The size of joists and studs in my designs depends on the structural strength of floor and wall modules 118, 120, how the modules are secured in place or integrated with the joists and studs, the spacings, etc., but ordinarily the principal joist members 114 will be 2" x 8", 2" x 10", 2" x 14" or 2" x 16" and the studs 116 will be 2" x 4" or 2" x 6", floor modules 118 will be 6" or 8" in thickness, and wall modules 120 will be 4" or 6" in thickness. Select grade lumber may be needed for straightness, avoidance of open knots, etc., because, in effect, some of the framing members form marginal walls of the "steam chest," and the fabricator may go farther into notchings, markings, etc., prefabricated to insure accurate placements. Usually dimensions will have such loose tolerances compared with normal steam chest equipment that venting will naturally occur without special provisions.

More specifically, FIG. 18 may be taken as showing 2" x 16" principal joist members (rough or finished), modules 118 expanding to 8", 2" x 8" laterals 130, and 2 x 4 members 132 which support the ends of laterals 130 which are notched to rest on members 132. The floor panel 118 at 140 in FIG. 18 is shown before expansion, whereas the remaining floor modules 118 are expanded into condition generally flush with the upper surface of joists 110. Usually these will be covered with some type of finish flooring, or with subflooring under something like linoleum or tile. The general expansion process, modular constructions, etc., follows that generically described in connection with FIGS. 10-12. The same applies to the wall modules 120 of FIG. 19. The modular panel 120 at 150 in the far wall in FIG. 19 is shown as expanded and the remainder of that wall unexpanded. Of course, expansion can be inward, as depicted, or outward. FIG. 19 also shows 2" x 4" cross-bracing 152 to hold studs in place during wall erection and foam expansion. Note that in both FIGS. 18 and 19 (as well as FIGS. 15 and 16) it is assumed that the framing forms the side edge cavity walls during plastic foam module expansion, even as the face plies form the face walls during expansion, so that no separate steam chest is needed at the building site. In other words, the "steam chests" are provided by the building structure itself. FIG. 19 shows plates 160 under studs 116 and cap plates 162 on top of studs 116, which form part of the side edge cavity walls during expansion of wall modules 120.

Some plastic foam processing takes relatively high pressures during at least final expansion and it will be observed thus far in the description of the building site fabrication (FIGS. 10-19), I have not described adaptation for such high pressures. For example of high pressures, the Dow polystyrene Pelaspan materials require pressures from 40-80 p.s.i. in order to produce "knit" of the beads, which pressure is normally generated by the blowing agent when granules or beads are expanded in relatively confined conditions.

Figure 20:
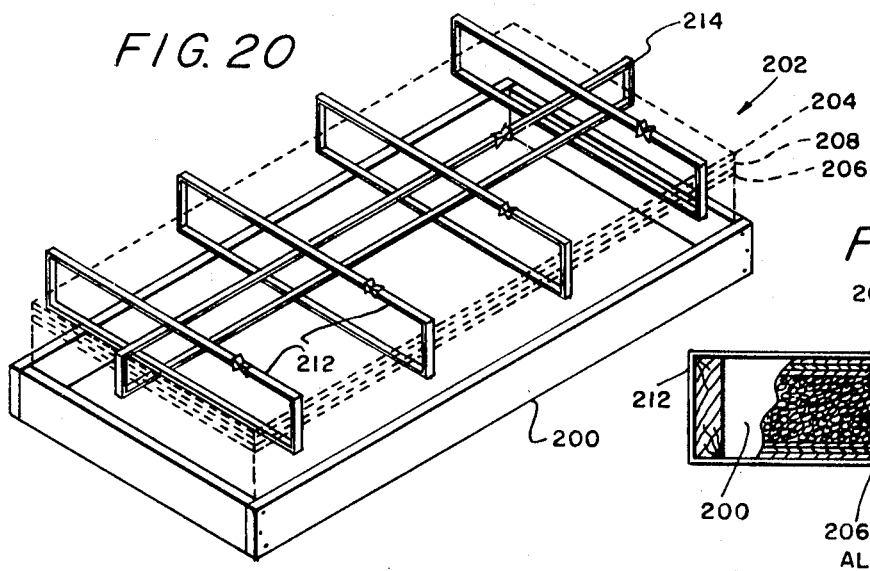
FIG. 20 is a perspective exploded view to illustrate a frame, a buiding module layup, and bands to hold the module in the frame during foam expansion.
Figure 21:
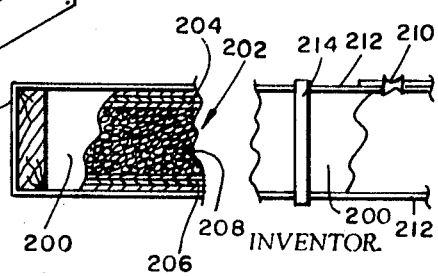
FIG. 21 is a fragmentary end view partly in section of frame, module and bands.
Figure 24:
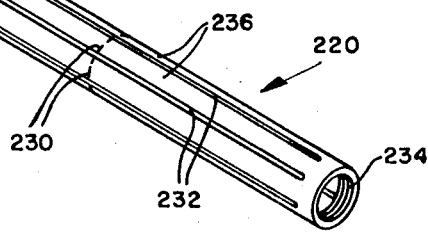
FIGS. 22, 23 and 24 are perspective views of an expansion limiting tie showing, respectively, fully collapsed, partly expanded and fully expanded conditions.
Figure 23:
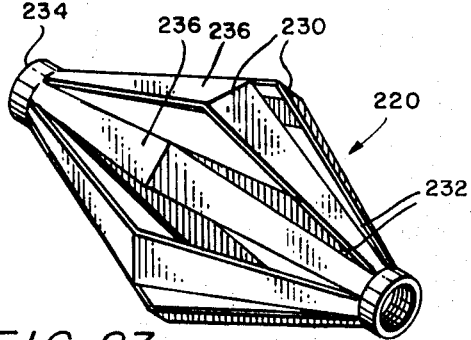

FIGS. 20-21 show use of a locking form, jig, etc., e.g., a restraint external of the foam layup. Of course it would be possible to provide plant type steam chest or other equipment but the effort in FIGS. 20-21 is to provide a type of restraining equipment adaptable to any building site fabrication including one with a minimum of expensive, heavy or bulky equipment. In the equipment of FIGS. 20-21 a marginal frame 200 is provided which may be fabricated from lumber dimensional stock or otherwise. The layup 202 includes face sheets 204, 206 and expandable plastic foam (prefoam or preform) ply 208 which is received with its margins closely fit by frame 200 during final foam expansion. Of course, one of the face plies 204, 206 has steam inlet means for steam probes. The face plies 204, 206 are restrained and the layup 202 is retained in place within frame 200 by steel bands (secured by the usual clips 210) including a plurality of transverse bands 212 and one or more longitudinal bands 214. Although other restraining means could be used to keep a layup within frame 200, the use of bands 212, 214 has good general application as the bands have sufficient strength, a mininum of equipment is required, etc. It will be understood: (a) during final expansion foam ply 208 expands from a thinner dimension to the dimension shown in FIG. 21 wherein layups 202 fills frame 200 (the thickness of the resultant building module is determined by the thickness of frame 200), (b) after expansion the bands are left on the assembly until sufficient cooling has occurred, (c) face sheets 204, 206 (as in the case of FIGS. 10-12) may be removable form sheets (resulting in a module of a lesser thickness when sheets 204, 206 are removed) or face sheets 204, 206 may be plies of a laminated structure which is laminated as described in connection with FIGS. 1-3 and 10-12, and (d) other fabrication details, steps, etc., will be obvious from the previous description.

FIGS. 22-25 show use of internal means to accept high final expansion pressures. The internal means shown is a form of expansion limiting tie 220 temporarily or permanently attaching between face sheets 222, 224 (which may be removable face form sheets or may be permanent face laminants) which limit expansion of thickness of the building module as foam interlayer 226 expands generating pressures extending tie 220 from its FIG. 22 collapsed position through its FIG. 23 partly extended position, to its FIG. 24 fully extended position. Marginal expansion of foam can be restrained by the in situ means shown in FIGS. 15-19, for example, or by a removable form such as the frame 200 shown in FIGS. 20-21.

Tie 220 is of hollow, tubular shape and is prebent at 230. It is split longitudinally on a number of lines or slots 232 whereby it may be said that the end annuluses 234 are connected by a series of spaced, radial webs 236. Fasteners 240, 242 may be secured by threads thereon and within annuluses 234, as shown, or may be otherwise secured by crimping, etc. The heads 244 of fasteners 240, 242 are accepted within counterbores 250 of the passages 252 in sheets 222, 224 that accept fasteners 240, 242 and/or annuluses 234. In the case of a laminated structure in which face sheets 222, 224 are not to be removed, fastener heads could be concealed, for example, by a thin decorative laminated sheet over one or more face plies. On the other hand, in the case that sheets 222, 224 are removable form sheets, fasteners 240, 242 would later be removed with sheets 222, 224 whereas fastener body 220 usually would be left in place embedded in the foam wall.

Fastener 242 has a passageway 250 to accept a steam probe 252 (and also can provide venting or the opposite fastener can have a vent passage), which means that the fasteners would have the location and dual function of steam inlet as well as spacer.

Figure 22:
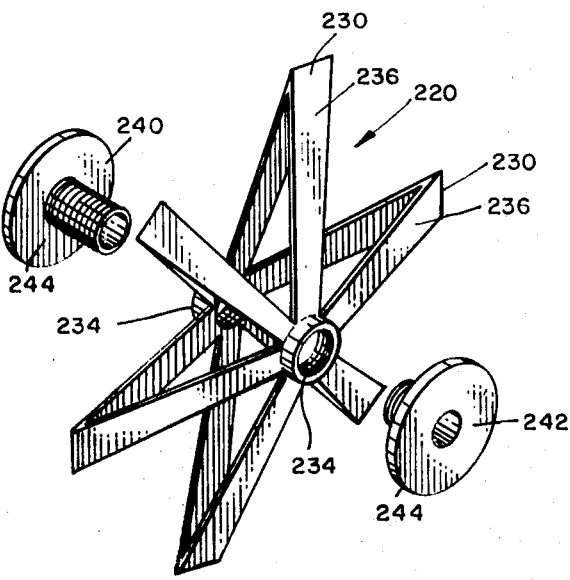
Figure 25:
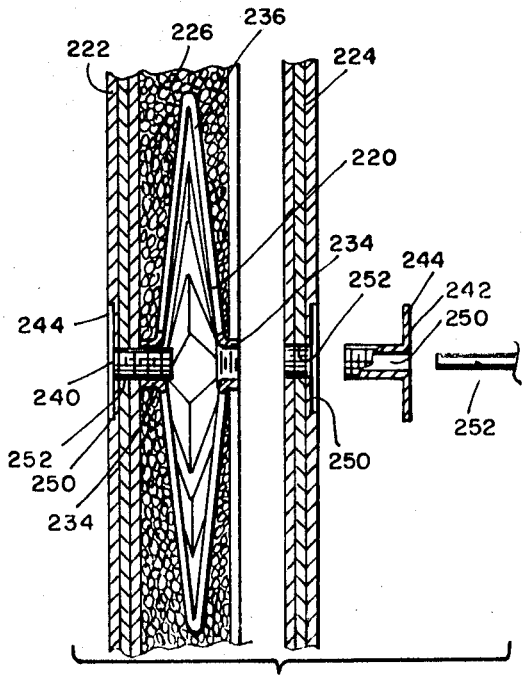
FIG. 25 is a cross-sectional exploded view showing the tie in use in a laminated structure, the tie and a foam interply being shown before complete expansion and during installation of the second face ply.

Of course tie 220 is embedded in preform or perfoam 226 during the FIGS. 1–3 in-plant fabrication, in the collapsed position of FIGS. 22 and 25. If preform or prefoam 226 is processed in FIGS. 1–3 with a face sheet 222 (which would be the case particularly in laminated modules), then the sheet 222 when positioned in the lower die 10 would have collapsed ties 236 secured thereto already by fasteners 244. The second face sheet 224 (having matching openings 252) could be secured to the assembly in-plant or on the building site. Securing of face sheets 222, 224 to inner plastic foam ply 226, does not have to depend entirely (if at all) on adhesion, in a laminated modular building wall, because ties 220 are adequate to secure the plies together. The tie system of FIGS. 22–25 can be adapted to accept whatever pressures are generated in final expansion of a particular plastic foam material, depending on spacing of ties and the strength designated into the tie (type and thickness of material, specifications, tolerances, etc.). The tie could take other forms, the most essential points being connection of face sheets and adaptation to expansion of the layup until a point at which the tie is tensed between the face sheets and prevents further expansion, the tie controlling the thickness of the building module.

In addition to petroleum wax type hot melt adhesives used in preforming, asphalt waxes may be used which have the capability of bonding polystyrene or urethane foam to itself, to metal, to wood and to masonry. Some specific asphalt adhesives are (a) Amkorite No. 2 made by Standard Oil of Indiana, (b) Parolite (medium) also made by Standard Oil of Indiana, (c) Flintkote No. 551 made by Flintkote Company, New York City, (d) Korkphalt made by Lewis Asphalt Engineering Company, Rahway, N.J., and (e) Socony Vacuum Asphalt, manufactured by Socony Mobil Oil Corporation, New York City.

Some test examples are given below. The test apparatus included a box frame using 90° angle steel, 1/8" thickness, one leg 6" and one leg 3". The box measured 4' x 8' x 6" with tolerances giving a free fit and venting for 4' x 8' panels of standard manufacture.

Example I (a) 1 sheet 3/4" marine plywood FIS. 1 sheet 1/2" inside grade plywood FIS. 11# Pelaspan 333 FR, Screen Size P (.026"–.039") mixed with 1.5# Amkorite No. 2.
(b) Materials cast within mold forming pattern as shown in FIGS. 1–4, creating a bead blanket 4' x 8' x 1/4".
(c) Plywood and blanket assembled as per FIGS. 22–25, with 32 collapsed 7/16" I.D. steel tube fasteners 220 embedded in bead blanket and secured to plywood sheets. This three component assembly then measured 4' x 8' x 1 1/2".
(d) Applied 212° F. steam at pressure of 40 p.s.i.g. for 25 seconds. Then probes are removed and face sheets are sprayed with a fine mist of water at 70° F. for five minutes.
(e) Resultant product was foam core, plywood faced laminated measuring 4' x 8' x 5 1/4" (5 1/4" maximum dimension determined by lengths of tubular fasteners 220 when extended to maximum length by high internal pressures of expanding foam). The foam bead core itself measured 4" in thickness and had a density of 1.0 lb./cu. foot.

Example II (a) Same materials as above except 16# of the unexpanded polystyrene beads (Pelaspan) were mixed with 1 3/4 # of asphalt hot melt adhesive (Amkorite).
(b) These materials were molded (preformed) into an unexpanded bead blanket measuring 4' x 8' x 5/16".
(c) Laminants secured by fasteners as above forming structure 4' x 8' x 1 9/16".
(d) Applied steam at 212° F. and 40 p.s.i.g. for 40 seconds. Probe assembly removed and cooling by fine water mist (70°) for 6.5 minutes.
(e) Resultant product (maximum thickness controlled by length of fasteners) 4' x 8' x 7 1/4". Expanded foam core measured 6" and had a density of 1.0 lb./cu. foot.

Example III (a) Same materials as above except 15# Pelaspan and 1.75# Amkorite.
(b) Bead blanket 4' x 8' x 5/16".
(c) Unexpanded laminant 4' x 8' x 1 9/16".
(d) Steam applied 40 seconds and spray mist 5 minutes.
(e) Expanded laminant 4' x 8' x 5 1/4". Core 4" thick and density 1.3.

Example IV (a) Same materials as above except 22# Pelaspan and 2.0# Amkorite.
(b) Preformed bead blanket 4' x 8' x 3/8".
(c) When assembled unexpanded as described above, dimensions 4' x 8' x 1 5/8".
(d) Steam applied 52 seconds and spray mist cooling 6.5 minutes.
(e) Expanded laminant 4' x 8' x 7 1/4". Core 6" thick and density 1.3.

In each of the above examples, the 4" or 6" core expanded foam condition was controlled by the length of fasteners 220.

The means and method of constructing building sections such as walls, floors, ceilings, etc., with structures including plastic foam material according to my invention will be understood by those working in the art from the foregoing description, who will understand various modifications of the specific embodiments shown and described herein after learning of this disclosure, and I do not wish to be limited to the precise details of these specific embodiments but instead wish to cover those modifications thereof which are properly within the scope of my invention.

I claim:
1. A building panel, comprising:
 (a) a plant formed sheet including heat expandable plastic foam material and expandable during building site construction,
 (b) said sheet having sufficient cohesiveness and rigidity to be capable of being handled as a sheet during transportation from plant to building site,
 (c) planar wall means confining the faces of said sheet for shape definition during sheet expansion at the building site, and said planar wall means having steam inlet means to at least one face of said sheet,
 (d) said sheet having relatively raised and depressed portions forming steam channel and distribution means from said steam inlet means across at least one face of said sheet to distribute steam for expansion of said sheet during construction.

2. The building panel of claim 1 in which said sheet is prefoamed.

3. The building panel of claim 1 in which said sheet is preformed and has raw plastic foam material and in which said sheet includes a binder to hold said foam material in sheet form.

4. The building panel of claim 1 in which the building planar module is a sandwich and said sheet formed from plastic foam material is a core laminant and said planar wall means is face laminant means.

5. The building panel of claim 4 in which said face laminant means includes a face laminant with edge grooves and structural framing means engaged in said edge grooves.

6. The building panel of claim 5 in which said structural framing means has I-beam shape with flanges fitting in said edge grooves.

7. The building panel of claim 6 in which there is a second opposite face laminant having recessed margins fitting opposite I-beam flanges when said plastic foam material of said core laminant is fully expanded.

8. The building panel of claim 1 in which there is building framing confining the edges of said sheet forming part of the enclosure for steam in expansion of said heat expandable plastic foam material.

9. The building panel of claim 8 in which said building framing is sidewall framing and includes a studding at each side of said sheet and plates above and below said sheet.

10. The building panel of claim 8 in which said building framing is floor joist framing and includes joists at each side and end of said sheet, parallel lateral members across the bottom of said sheet between said joists, and longitudinal members supporting the ends of said lateral members which are notched to receive said longitudinal members.

11. The building panel of claim 1 in which said planar wall means are removable building forms.

12. The building panel of claim 1 in which there is means accepting pressures generated by said plastic foam material during final expansion including a series of tie means between said planar wall means at each face of said sheet, said tie means when fully tensed determining the final thickness of the building module.

13. The building panel of claim 12 in which said tie means has a collapsed position before final expansion permitting said planar wall means to abut said sheet before the building module assumes said final thickness.

14. The building panel of claim 13 in which each tie means has the form of a hollow cylinder when expanded with annular end portions and being slitted between the annular end portions forming a series of webs, there between which are folded in radially arranged dispositions when said tie means is in collapsed position, said annular end portions being interiorly threaded and bolt-like fasteners extending through said planar wall means and threadedly engaged in said annular end positions.

15. The building panel of claim 14 in which said fasteners have heads countersunk in the surfaces of said planar wall means, and at least part of said fasteners having axial passages therethrough to accept steam probes to form said steam inlet means.

References Cited

UNITED STATES PATENTS

| | | | |
|---|---|---|---|
| 3,041,220 | 6/1962 | Martin | 161—161 |
| 3,000,144 | 9/1961 | Kitson | 161—161 |
| 3,255,559 | 6/1966 | Gaeth | 52—232 |
| 3,381,076 | 4/1968 | Govatsos | 161—159 |

JOHN E. MURTAGH, Primary Examiner

U.S. Cl. X.R.

52—173, 496, 615, 617; 161—123, 161; 264—45